Nov. 10, 1936.　　　A. D. BURT ET AL　　　2,060,025
VIBRATOR POWER SUPPLY SYSTEM
Filed Feb. 1, 1935
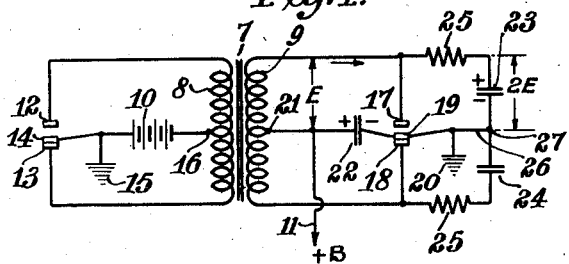
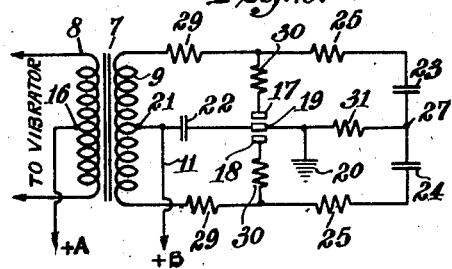
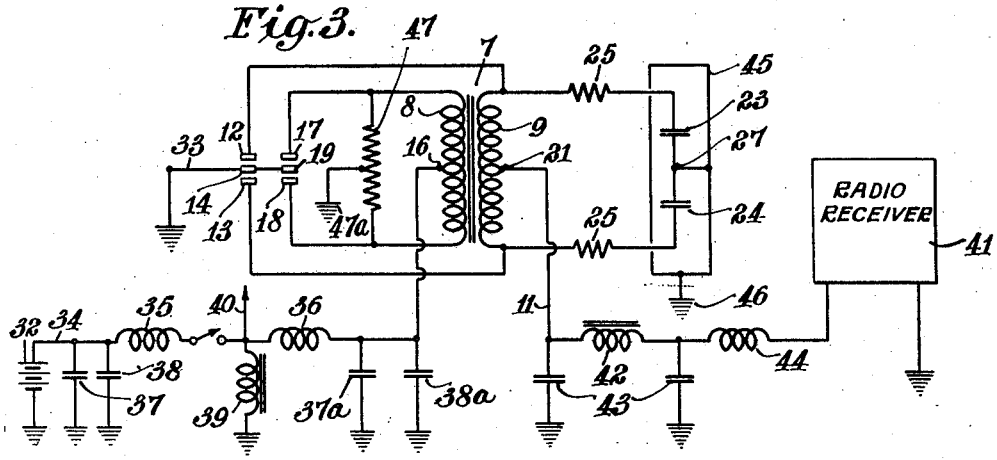
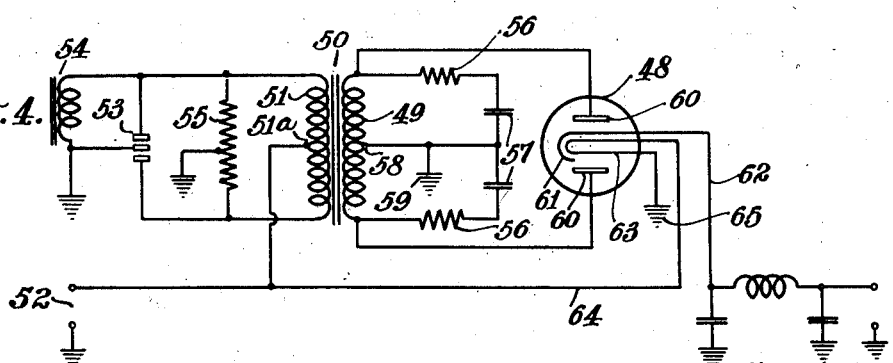
INVENTORS:
Alexander D. Burt,
Arnold J. Rohner,
Frederic Showp,
BY
ATTORNEY.

Patented Nov. 10, 1936

2,060,025

UNITED STATES PATENT OFFICE 2,060,025

VIBRATOR POWER SUPPLY SYSTEM

Alexander D. Burt, Narberth, Pa., and Arnold J. Rohner, Haddon Heights, and Frederic Shoup, Oaklyn, N. J., assignors to Radio Corporation of America, a corporation of Delaware Application February 1, 1935, Serial No. 4,584

7 Claims. (Cl. 171—97)

The present invention relates to vibrator power supply systems of the type employed in connection with low voltage battery power sources for supplying higher voltage, anode and other operating potentials to radio receiving apparatus and the like.

Systems of the type above referred to, comprise a step-up transformer, means for interrupting the primary current thereto, and means for rectifying the secondary voltage. The last means may preferably comprise contacts movable in synchronism with contacts provided in the first named means or may be provided by an electric discharge rectifier device.

Loss of operating efficiency resulting from contact burning may be sufficiently rapid to render the use of such vibrator power supply systems impracticable in connection with radio receivers and the like. Furthermore, such operation may cause considerable high frequency interference in the apparatus to which power is supplied.

It is, therefore, an object of the present invention to provide an improved vibrator power supply system embodying a transformer, a vibrator current interrupter therefor, and rectifier means, that shall have a prolonged operating life and that shall not produce appreciable high frequency interference.

It is a further object of the present invention to provide a vibrator power supply system adapted for use in connection with radio receiving apparatus and the like without introducing undesirable high frequency interference therein by reason of its operation.

It is a still further object of the present invention to provide in a vibrator power supply system an improved rectifier circuit for producing anode and similar high potential in connection with a vibrator current interrupter without the production of high frequency interference.

It is also a further object of the present invention to provide an improved vibrator power supply system having a secondary circuit, including a buffer capacity, adapted to reduce contact burning or wear in the current interrupting or rectifying means, and for preventing the generation and radiation of high frequency currents which tend to create disturbances in associated and connected apparatus.

The invention will be better understood from the following description, when considered in connection with the accompanying drawing, and its scope will be pointed out in the appended claims. In the drawing Figure 1 is a schematic circuit diagram of a vibrator power supply system embodying the invention, Fig. 2 is a similar circuit diagram showing a modification of the circuit of Fig. 1, Fig. 3 is a schematic circuit diagram of a vibrator power supply system similar to that of Fig. 1 and embodying the invention, for use in connection with radio receiving apparatus and the like, and Fig. 4 is a similar circuit diagram showing the modification of the system shown in Fig. 3.

Referring to Fig. 1, the vibrator power supply system shown, comprises a step-up transformer 7 having a center tapped primary winding 8, a center tapped secondary winding 9, and vibratory contact means for alternately energizing the primary winding from a battery or low voltage source 10, for rectifying the secondary voltage and supplying the same to a high voltage positive output lead 11.

In the present example, the vibrator contact means comprises fixed contacts 12 and 13 connected to the terminals of the primary winding and having a movable vibratory contact 14 connected to ground 15 and to the battery source 10, while the opposite terminal of the battery source is connected with a center tap 16 on the primary winding.

The vibratory contact means further comprises a second set of fixed contacts 17 and 18 connected with the terminals of the secondary winding 9 and having a vibratory or movable contact 19 connected to ground 20. The high voltage supply lead 11 is connected with a center tap 21 on the secondary winding, and operation of the vibratory members 14 and 19 simultaneously, serves to set up a voltage in the secondary and full wave rectification thereof, as is well understood in connection with devices of this character. A filter condenser 22 is connected between the high voltage lead 11 and ground through the contact 19, as indicated, and serves to smooth the output current.

The transformer 7 is preferably designed to operate well below saturation in order to reduce the exciting current and, in any case, it is of such design as to permit a relatively wide variation in primary supply voltage without saturating. This is for the reason that battery voltages in the usual application of systems of this character, as in automobiles, may vary between relatively wide limits. Such voltages in automobile installations may vary between 5 and 10 volts, and a voltage variation of from 6 to 8 volts is common, as is well known. Accordingly, the transformer should be designed to operate below saturation and with a safe value of exciting current at the upper limit of the voltage variation range.

In order to prevent the sudden interruptions of the exciting current to the transformer, a buffer capacity is provided in connection with one of the windings, and preferably the secondary winding, since buffer capacity may be of lower value and involves the use of smaller value and less costly condensers than if provided in connection with the primary winding.

Furthermore, the buffer capacity is mid-tapped to ground or to the moveable or common contact of the rectifier means, if a vibratory device is employed as such means, to reduce the high frequency interference caused by operation of the vibratory system. In a preferred embodiment of the invention, as shown, the buffer capacity comprises two condensers 23 and 24 connected in series across the secondary winding 8, being connected in the present example with the contacts 17 and 18 each through a series resistor 25. The mid-tap 27 of the buffer capacity is connected to the contact 19 and the ground 20 by a connection 26.

In the operation of the system shown, the contacts 12 and 13, and the contacts 17 and 18, are initially spaced apart a predetermined distance to permit the moving contacts 14 and 19 to move between them a sufficient distance to break from the one before closing with the other, as is well understood. The voltage E generated in each half of the secondary winding is alternately applied between the output lead 11 and ground. It will be seen that by eliminating the resistors 25 from the circuit, the buffer condensers 23 and 24 are alternately short-circuited, through only the contact resistance. In the position shown, the contacts 19 and 18 are closed and the contacts 14 and 13 are closed. Considering the resistances 25 out of circuit for the present, the condenser 24 is, therefore, short-circuited.

When the contacts 19 and 17 were closed before moving across the gap and assuming the position shown, the condenser 23 was short-circuited and its voltage at the instant of opening was zero. The voltage across the other capacity condenser 24 was then approximately twice the direct current voltage that appears on the first filter condenser 22, assuming that the latter is charged. This is for the reason that the condenser 24 was then connected across both halves of the secondary.

At the instant the vibrator contacts close in the position shown, the buffer current flowing into the condenser 23 and out of the condenser 24 in the direction indicated by the arrow, changes the voltage across each of the condensers, and if the condensers are of exactly the correct capacity the voltages will be exactly the reverse of what they are when the contacts opened. The condenser 23 will then have a voltage of 2E and the condenser 24 will have a voltage of zero. By having the condensers 23 and 24 of exactly the right capacity is meant that the one may completely charge and the other completely discharge during the time interval in which the contact 19 travels from the one contact to the other. Under these conditions, the contacts may close and open without creating electrical surges.

There are, however, certain practical considerations which prevent the use of exactly the correct value for the two sections of the buffer capacity. It has been found that a buffer capacity which is exactly correct for a circuit supplied from an 8-volt source, for example, is too large for a 6-volt source. Similarly, a buffer capacity which is correct for use in connection with a vibrator having contacts worn in service to a wider gap, is too large for a similar new vibrator having contacts properly adjusted in spaced relation to each other.

It is clear that such conditions must be provided for in operation and, accordingly, the buffer capacity must ordinarily be too large in value initially for the ideal condition of operation above described. The result of operation with a buffer capacity of too high a value is that the buffer current may not completely charge the one half of the buffer capacity while the other half thereof is not completely discharged during the elapsed time of contact change. Therefore, the voltages on the two halves of the buffer capacity do not complete the reversal of voltage in the time interval between the opening and the closing of the contacts. Under such conditions, the condenser 24, for example, when short-circuited, will still retain a certain charge and a certain voltage, while the other condenser 23, for example, instead of being charged to a voltage 2E will be charged to a lesser value.

Obviously, under these conditions, when the contacts close, a disturbance or electrical surge is created, for the reason that the remainder of the charge or discharge must be completed substantially instantly. The condenser across the open contact is suddenly charged to the full voltage 2E, requiring a sudden surge of charging current from the secondary and this current is limited only by the leakage reactance and the resistance of the transformer.

In connection with the other condenser, the condition is even more serious in that the remaining voltage is suddenly reduced to zero by short-circuit as the contacts close, resulting in a high surge of short-circuit current. This not only sets up high frequency interference which may appear in associated apparatus, but also serves to burn away the contacts.

It is, therefore, desirable and necessary to provide means for preventing not only surges of charging current, but also surges of short-circuit or discharge current in connection with a full wave rectifier system of the character shown, and it has been found that this may be done by the use of resistance in the rectifier circuit at proper points, however, without interfering with the load current from the rectifier, while at the same time permitting the buffer capacity to be grounded or connected to the common contact of the vibrator rectifier at its mid-point or electrical center to prevent high frequency interference.

The use of a single buffer capacity across the entire secondary winding without grounding the mid-point thereof fails to prevent high frequency interference in apparatus circuits connected therewith. The electrical center or mid-tap of such capacity must be grounded or connected to the mid-contact of the rectifier circuit for reduced interference to a minimum.

Numerous points for the insertion of resistance in the rectifier circuit have been considered, and suitable points are shown in Fig. 2 to which attention is now directed. Since this is a modification of the circuit of Fig. 1, like parts are indicated by the same reference numerals as in Fig. 1.

Referring to Fig. 2, it will be noted that the resistors 25 are in circuit with each of the condensers 23 and 24 on opposite sides thereof and of the mid-tap 27. Resistors indictated at 29 may be inserted between the secondary winding and the rectifier contacts 17 and 18 to prevent surges of charging current on the open circuit portion of the buffer capacity, but such resistors will lie in load circuit and impede the load current. Therefore, the position of the resistors 25 for this purpose is preferred.

Resistors may be placed in circuit adjacent to the contacts 17 and 18, as indicated at 30, being in circuit with the load current and the buffer capacity to reduce or prevent surges of short circuit or discharge current from the portion of the buffer capacity across which the contacts have just closed. However, this position has the disadvantage that the load or output current may be reduced thereby, since the load or output current to the lead 11 or to ground must pass through the rectifier contacts.

A single resistor in the position indicated at 31, between the mid-tap 27 on the buffer capacity and the grounded contact 19, serves to prevent the flow of excessive discharge or short-circuit current from each half of the buffer capacity, but does not prevent the flow of excessive charging surges through the transformer to each portion of the buffer capacity. In this respect it would have the same disadvantage as the positions indicated at 30. It will, therefore, be seen that except in the positions indicated at 25, more than two resistors would be required in the full wave rectifier shown. The position 31 is further undesirable for the reason that it serves to separate the mid-tap 27 from the contact 19 and ground 20 since, for the prevention of high frequency interference, it has been found desirable and substantially necessary to have the buffer condenser mid-tapped to ground and/or to the common contact of the vibrator rectifier when used.

The resistors 25 connected each with one terminal of the transformer secondary and between that terminal and one half of the buffer capacity, with the mid-tap of the buffer capacity connected to ground or to the common contact of the vibrator rectifier device, is at present preferred. Such resistors may be considered as dampening resistors or impedances for damping out high frequency transients and surges incident to the operation of a vibrator power supply system, and resulting from supply voltage variations and from unavoidable wear of the vibrator contacts. Such damping means may cause unstable operation of a vibrator power supply system, and violent sparking at the contacts, unless the transformer is designed to operate below saturation with the exciting current at a normal value. It has been found that when the transformer is saturated and the exciting current is therefore abnormal, the use of series impedances or resistors in the rectifier circuit and in circuit with the buffer capacity prevents the latter from functioning properly.

With a more conservative design of the transformer, for proper operation, as above referred to, it has been found that damping resistors of relatively low value may be employed in circuit, with buffer condensers also of relatively low value if employed in connection with the secondary. For example, the resistors 25 may be substantially 50 ohms, while the series connected buffer condensers 23 and 24 forming the buffer capacity may be each of the value of .02 mfd. With a properly designed transformer and a vibrator type of rectifier, as shown in Figs. 1 and 2, and a vibrator in connection with the primary, life tests have shown that the decline in output voltage after 500 hours of operation has been less than 10%, while for similar vibrator power suppy systems not embodying the present circuit due to secondary contact wear or burning, a decline of over 25% in output voltage was found after an average of substantially 200 hours of operation. Furthermore, the high frequency interference was substantially negligible from a system embodying the circuit of Fig. 1.

A power supply system of the character shown in Fig. 1 may be arranged for the supply of radio receiving apparatus and the like, such as an automobile radio receiver, as shown in Fig. 3, wherein like parts as appear in the preceding figures are designated by the same reference numerals.

Referring to Fig. 3, the transformer 7 is connected to the automobile battery indicated at 32, which is grounded on one side. The battery current to the primary 8 is interrupted by the contact 14 moving between the fixed contacts 12 and 13, on a grounded vibratory arm or member 33. The arm also carries the secondary vibrating or common contact 19, whereby the latter contact moves, simultaneously or in synchronism with the primary contact, between the secondary contacts 17 and 18, to rectify the secondary voltage. The battery connection is completed through ground and through the battery wiring, including the hot or ungrounded lead indicated at 34, which connects with the center tap 16 on the primary winding.

Two high frequency filters are interposed between the battery and the primary winding comprising two series high frequency choke coils 35 and 36, and shunt filter capacity comprising two condensers 37 and 38 on the input side of the first choke 35 and condensers 37a and 38a on the output side of the second choke 36, adjacent in circuit to the center tap 16. The condensers 38 and 38a are low capacity low inductance condensers for high frequency current shunting the higher capacity filter condensers 37 and 37a, the latter being provided primarily for smoothing low frequency ripples in the supply current. The loud speaker field winding, indicated at 39, and a lead 40 for supplying filament circuits, are connected with the lead 34 between the two filter choke coils, as indicated. With this arrangement the filament circuits and loud speaker field are suitably isolated from the rectifier vibrator, and from the supply wiring connected with the battery, while the latter wiring is isolated from the vibrator rectifier against the introduction of radio high frequency interference.

On the output side of the supply system, a radio receiver, indicated at 41, is connected with the output lead 11 and with ground for receiving operating or anode current therefrom through a suitable low frequency filter comprising a series choke coil 42 and the usual shunt filter condensers 43, followed in circuit by a high frequency filter choke coil 44, thereby further isolating the receiver from low frequency and high frequency interference originating in the power supply system.

In the present example, the surge and discharge reducing resistors 25 are connected between each terminal of the secondary winding 9 and the series connected condensers 23 and 24, forming the buffer capacity, and the latter are enclosed in a suitable shield 45 preferably of metal and grounded, as indicated at 46. The mid-tap 27 of the buffer capacity is connected to the metal shield 45 and is, therefore, grounded and through ground is connected with the grounded vibrator arm 33.

It has been found that the buffer capacity may preferably be made up as a unit for commercial use and for mounting in power supply apparatus with but two leads brought out therefrom, as shown, while the center or mid-tap connection is made to the casing of the container. This arrangement not only facilitates manufacture and mounting, but has been found to further materially reduce certain types of high frequency interference in connection with radio receiving apparatus, as shown.

It has further been found to be desirable in connection with a system as shown, comprising a primary vibrator and an ungrounded mid-tap for the primary winding, to provide a grounded mid-tap therefor in the form of a center-tap resistor, such as indicated at 47, connected across the terminals of the primary winding and mid-tapped to ground, as indicated at 47a. In all cases, the reference to ground does not necessarily include an actual ground, but only a connection to the apparatus frame or chassis with which the power supply system is used or to the chassis of the power supply apparatus in which the system shown is incorporated. The present arrangement for mid-tapping primary winding directly to ground serves materially to lessen the effect of the operation of the primary contacts, after considerable wear in use, to set up high frequency disturbances in the power supply system.

Referring now to Fig. 4, a vibrator power supply system is shown wherein an electric discharge rectifier device 48 is employed in connection with the secondary 49 of a power supply transformer 50. The primary 51 of the transformer is connected through its center tap 51a to a low voltage supply source 52, while the terminals of the transformer are alternately connected to ground and the opposite side of the supply source to vibratory contacts indicated at 53, and actuated by a magnet 54 associated therewith. The primary 51 is preferably center-tapped directly to ground through the center-tap resistors 55 connected in shunt therewith, as shown.

The secondary 49 is provided with the shunt series filter network comprising the series damper resistors 56 and the series connected condensers 57, center-tapped directly to the center-tap 58 of the secondary and grounded, as indicated at 59.

The rectifier is a full wave device comprising two anodes 60 connected with the terminals of the secondary 49 and having a cathode 61 connected with the power output lead 62. The heater or filament 63 for the cathode 61 is supplied from the same source as the primary of the transformer, and for that purpose is connected with the supply 52 through a supply lead 64 and ground, as indicated at 65.

It will be noted that in connection with an electric discharge rectifier device, the center tap of the power supply transformer is grounded, while the terminals thereof are ungrounded, contrary to the vibrator circuit wherein the center-tap provides the high voltage output terminal, and the terminals are alternately grounded through the vibrator contact. In any case, however, it will be noted that the center-tap of the buffer capacity comprising the sections 57, is connected to ground, and since the terminal 58 of the transformer is also grounded, the mid-tap of the buffer capacity is also connected thereto. The operation of the primary circuit functions as in the usual manner in connection with vibrator-type rectifiers.

The buffer capacity tunes the secondary so that its two sections charge and discharge during the time interval that the contacts of the vibrator 53 are moving between limits. The condensers are prevented from receiving surges by the series resistors 56 when the conditions of operation are such that the primary voltage is relatively high, and when the rectifier system is new and the contacts of the rectifier 53 are adjusted at the factory to insure proper operation over a relatively long period of operation.

As in the circuits hereinbefore described, the buffer capacity is preferably relatively large with respect to its required value for proper operation when the power supply system or the contacts are new and in proper adjustment, to permit satisfactory operation after prolonged use and wear.

We claim as our invention:

1. In a vibrator power supply system, the combination with a power supply transformer, of a buffer capacity connected across one of the windings of said transformer, a power supply circuit having leads connected with said one winding, and means providing a circuit external and not included in said power supply circuit and in series with the buffer capacity for preventing high frequency surges through said buffer capacity, said last named series circuit being grounded through a center tap on said buffer capacity.

2. In a vibrator power supply system, the combination with a power transformer having primary and secondary windings, means for interrupting a primary current, means for rectifying a secondary voltage resulting from interruption of the primary current, and means for smoothing the operation of said interrupting and rectifying means and for reducing high frequency interference therefrom, comprising a pair of condensers of substantially equal capacity connected in series across one of said transformer windings, a damping resistor external to the load circuit of said power supply system for preventing surges through said condensers, said resistors being connected in circuit between said condensers and the terminals of said winding, and means providing a low impedance ground connection between and directly with said condensers.

3. In a vibrator power supply system, the combination with a power supply transformer having a secondary winding, of a rectifier connected with the terminals of said winding and having a power output connection, a mid-tap on said secondary winding providing a second power output connection, a pair of damping resistors and a pair of buffer condensers providing a series circuit across the terminals of said winding, the resistors being each adjacent to one of the terminals of said winding, means providing a center tap connection between said condensers and one of said power output connections, and said buffer condensers each being of a capacity to provide with said resistors and the secondary winding a damped tuned circuit wherein one condenser may charge during substantially the time interval within which the other condenser discharges through said circuit.

4. In a power supply system for radio receiving apparatus and the like, the combination of a step-up transformer adapted to operate below saturation with relatively wide variations in supply voltage about a predetermined normal value, said transformer having a primary winding and a secondary winding each provided with end terminals and a center tap, means providing a low voltage supply circuit for said primary winding through said center tap and a ground connection, vibrator contact means for alternately connecting the terminals of said primary winding to said power supply circuit through said ground connection, rectifier means connected with said secondary winding to rectify the secondary voltage, a power output circuit connected with the center tap of the secondary winding and said rectifier means, and independent high frequency interference damping circuit means including a buffer capacity comprising two condensers connected in series across the secondary winding with a center tap between said condensers to ground, and a damping resistor in circuit between each condenser and a terminal of the secondary winding, thereby to provide a balanced damped tuned circuit to ground in connection with said secondary winding.

5. In a power supply system for radio receiving apparatus and the like, the combination of a step-up transformer adapted to operate below saturation with relatively wide variations in supply voltage about a predetermined normal value, said transformer having a primary winding and a secondary winding each provided with terminal ends and a center tap, means providing a low voltage supply circuit for said primary winding through the center tap thereof and a ground connection, vibrator contact means for alternately connecting the terminals of said primary winding to said power supply circuit through said ground connection, rectifier means connected with said secondary winding to rectify the secondary voltage, a power output circuit connected with the center tap of the secondary winding and said rectifier means, a buffer capacity comprising two series condensers connected in shunt relation to the secondary winding and having a center tap connection for one of said circuits between said condensers, and a damping resistor in circuit between each condenser and a terminal of the secondary winding, said condensers having substantially equal capacity of such value that one condenser may substantially charge and the other condenser may substantially discharge during the time interval for change of connection of the contact means from one terminal to the other.

6. In a grounded power supply system, the combination of a step-up transformer having a primary winding and a secondary winding each provided with end terminals and a center tap, vibratory contact means for connecting the terminals of said primary winding to ground, means connected between ground and the center tap on the primary winding for supplying current to said primary winding, high frequency interference damping means including a pair of condensers connected in series across the secondary winding, the point of connection between said condensers being connected to the center tap of the secondary winding and to ground, and a damping resistor connected between each condenser and a terminal of the secondary winding, an electric discharge rectifier device having two anodes, one of which is connected with each of the secondary terminals, a cathode, and an output circuit connected with said cathode.

7. In a vibratory power supply system for radio receiving apparatus and the like, the combination with a step-up transformer, of a power output circuit therefor, means for preventing high frequency surges in connection with the operation of said transformer comprising a pair of condensers of substantially equal capacity value connected in series across one of said transformer windings and external to the power output circuit, a resistor connected in circuit between each of said condensers and one of the terminals of said winding, said resistors being of substantially equal resistance values, a metallic shield casing enclosing said condensers, and means providing a connection between said condensers and the casing, whereby said condensers may be connected to ground through said casing, thereby to provide a balanced damped tuned circuit to ground in connection with said one winding.

ALEXANDER D. BURT.
ARNOLD J. ROHNER.
FREDERIC SHOUP.